United States Patent [19]

Giannelli

[11] Patent Number: 4,970,948
[45] Date of Patent: Nov. 20, 1990

[54] AUTOMATIC HOUSEHOLD-TYPE MACHINE FOR PREPARING ESPRESSO COFFEE OR GERMAN COFFEE PERCOLATE

[75] Inventor: Giuseppe Giannelli, Como, Italy
[73] Assignee: Micromax S.p.A., Como, Italy
[21] Appl. No.: 412,055
[22] Filed: Sep. 25, 1989
[51] Int. Cl.⁵ .......................... A47J 31/42; A47J 31/36
[52] U.S. Cl. ......................................... 99/280; 99/286; 99/289 R; 99/300
[58] Field of Search .................. 99/279, 280, 281, 282, 99/286, 289 R, 297, 300, 302 R; 426/433

[56] References Cited

U.S. PATENT DOCUMENTS 4,624,177  11/1986  Kani ........................................ 99/286
4,796,521  1/1989   Grossi ................................. 99/289 R
4,858,522  8/1989   Castelli ............................. 99/289 R Primary Examiner—Robert W. Jenkins
Attorney, Agent, or Firm—Sughrue, Mion, Zinn, Macpeak & Seas

[57] ABSTRACT

An automatic household-type machine of a kind which comprises a percolation chamber having an outlet conduit for dispensing the coffee percolate, a heated water storage boiler, a pump having its delivery side communicated with the chamber and suction side communicated with the boiler, and an electronic control device linked operatively to a timer for activating the pump for pre-set time periods, further comprises a heater plate carried on a machine base and a manually operated two-way valve mounted on the free end of the outlet conduit from the percolation chamber. Connected to respective outlets of the valve are a first conduit for dispensing espresso coffee and a second conduit extending cantilever-fashion over the plate and being adapted to dispense German coffee percolate.

13 Claims, 5 Drawing Sheets

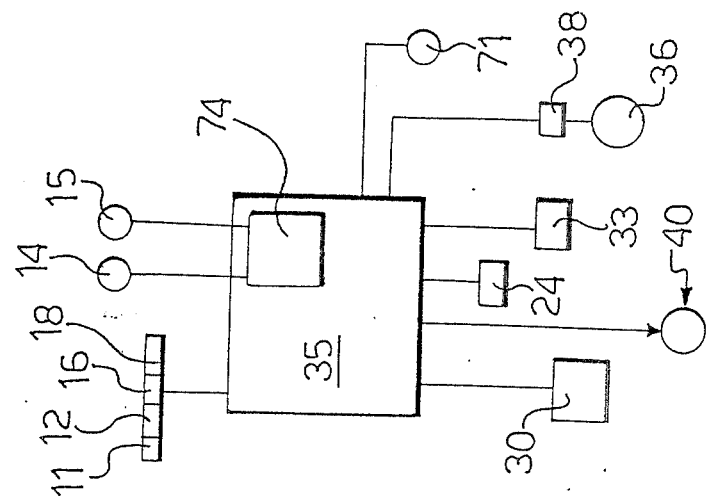
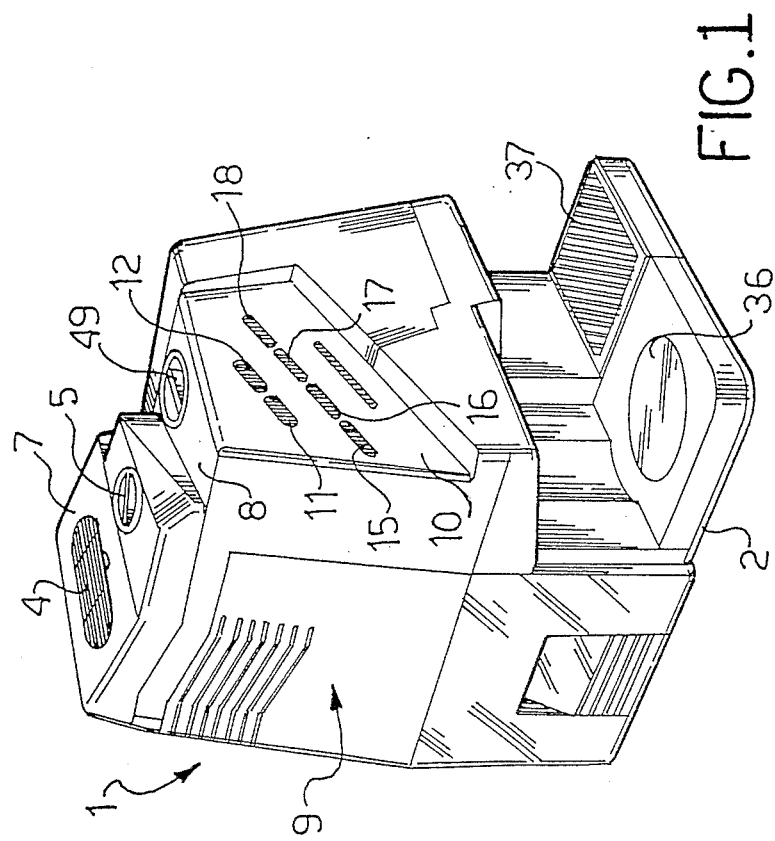

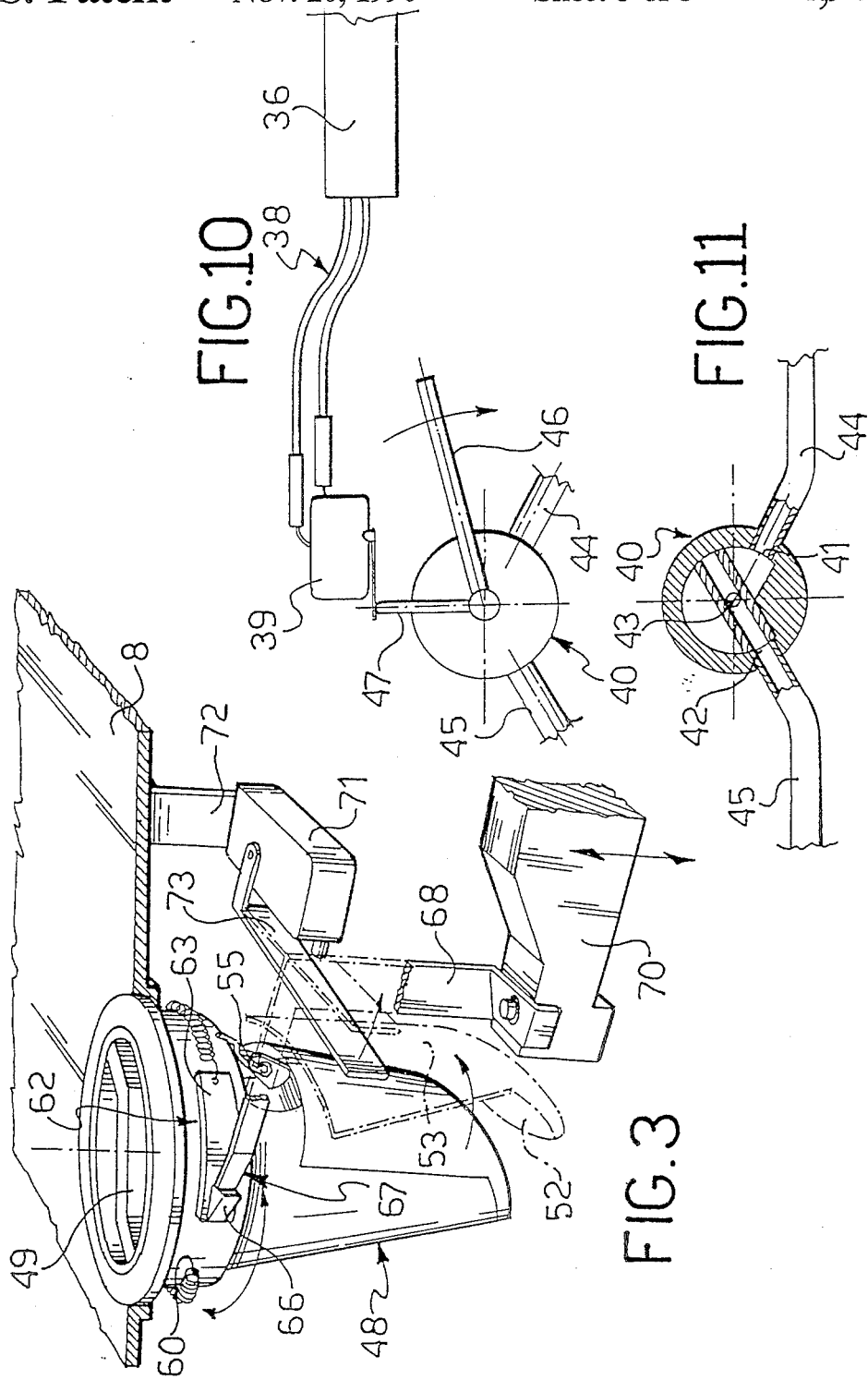

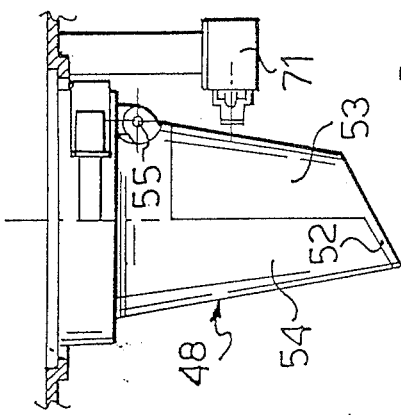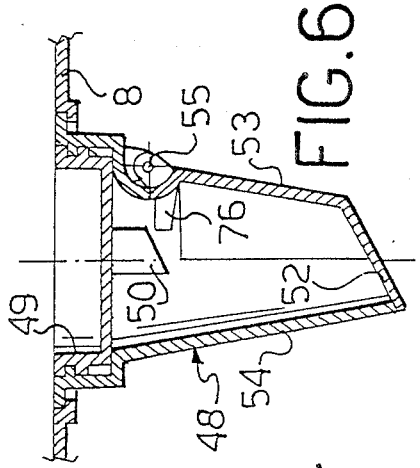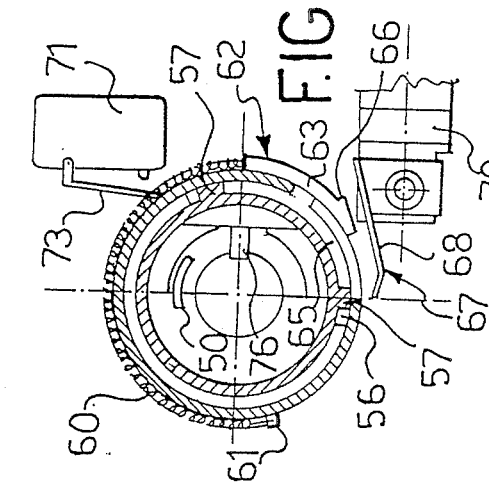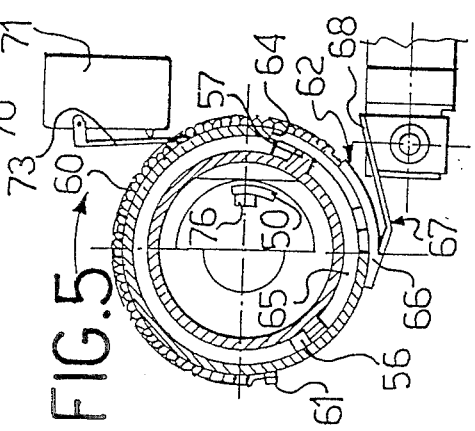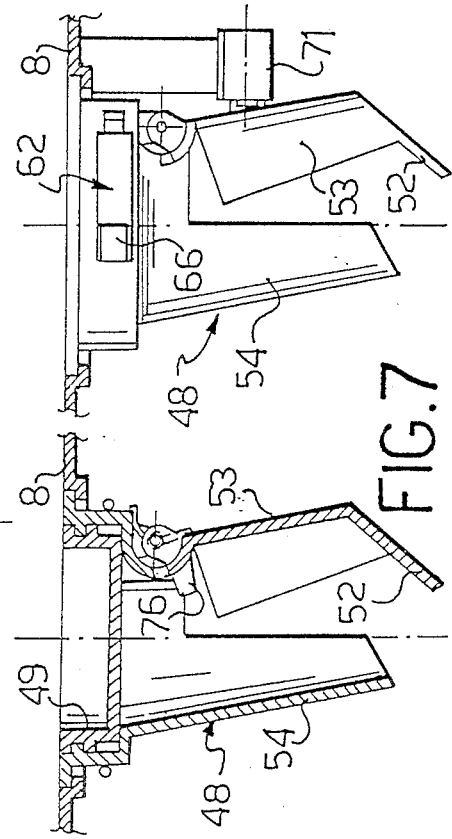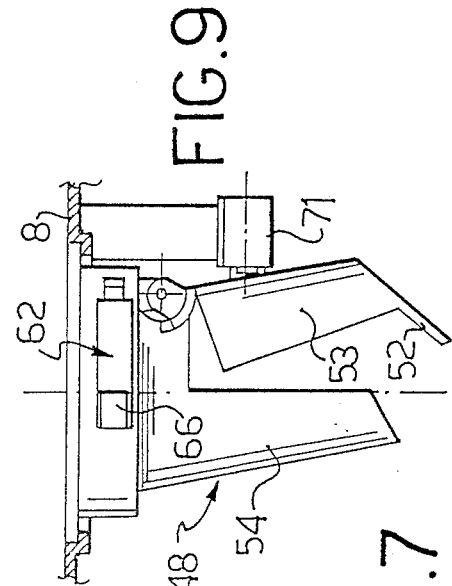

AUTOMATIC HOUSEHOLD-TYPE MACHINE FOR PREPARING ESPRESSO COFFEE OR GERMAN COFFEE PERCOLATE

DESCRIPTION

This invention relates to an automatic household-type machine for preparing "espresso" coffee or "German" coffee percolate, being of a kind which comprises a percolation chamber wherein a piston is guided for movement, a chute for loading the chamber with a metered amount of powder coffee, a heated water storage boiler, a pump having its delivery side in communication with said chamber and its suction side in communication with said boiler, an outlet conduit leading out of said chamber for dispensing the coffee percolate, and an electronic control device operated by a timer to activate said pump for operation over pre-determined time intervals.

As is well known, growing popularity is being enjoyed at the present time by automatic household-type machines for preparing espresso coffee. Such machines are set up to arrange, in a fully automated manner, for grinding a set amount of coffee, feeding ground coffee into a percolation chamber, adequately compressing the coffee powder within the ber, supplying hot water under pressure to said chamber, to thereby dispense espresso coffee therefrom.

In order to perform all these operations, such machines are conventionally equipped with a hot water storage boiler and a cylinder/piston assembly movable toward and away from the percolation chamber under control by an electronic control device. In addition, a pump is provided for feeding hot water under pressure into the percolation chamber after the coffee powder has been compacted.

Such machines are also equipped with means of ejecting the spent coffee cake which comprise a plate, movable between the bottom and the inlet mouth of the percolation chamber, and a pusher, substantially in the form of a doctoring blade, which is movable across the plate at the level of the inlet mouth.

While in many ways advantageous, conventional espresso coffee making machines are found unsatisfactory by an appreciably large number of consumers who prefer a particular coffee percolate commonly referred to as "German" coffee, which is generally prepared from lyophilized coffee powder and an abundant supply of boiling water.

This coffee percolate, which may be viewed as a more diluted percolate, is often prepared somewhat in advance of its consumption, e.g. in a decanter or pot which is then re-heated on a plate heater immediately prior to drinking it.

No coffee-making machines are currently known which can perform the above operations in an automate manner for preparing German coffee percolate.

This deficiency of the prior art is felt especially by those users who already own an automatic espresso coffee maker and got used to such commodities.

The technical problem that underlies this invention is to provide an automatic household-type coffee making machine which has such structural and performance characteristics as to afford a dual mode of operation, to make espresso coffee or German coffee percolate, as desired, and fill accordingly a gap left in the prior art.

The solutive idea on which this invention is based is one of utilizing, to prepare German coffee percolate, some of the component parts of automatic espresso coffee makers, specifically the heated water storage boiler and the pump, as arranged to be operative for predetermined time periods.

This technical problem is solved by a machine as indicated comprising a heater plate carried on a base of said machine and a manually operated two-way valve mounted on the free end of said outlet conduit, connected to respective outlets of said valve there being a first conduit adapted to dispense espresso coffee and a second conduit extending cantilever-fashion over said heater plate and being adapted to dispense German coffee.

In a preferred embodiment, the heater plate is connected to a power supply circuit which has a microcontact connected serially therein, said micro-contact being activated automatically on said valve being switched over to dispense German coffee.

The features and advantages of a machine according to the invention will become apparent from the following detailed description of an embodiment thereof, given by way of non-limitative example in connection with the accompanying drawings.

In such drawings:

FIG. 1 is a vertical elevation, perspective view of the outer shell and the outward appearance of the automatic machine of this invention;

FIG. 3 is a perspective detail view of the machine shown in FIG. 1;

FIGS. 4 to 9 are respective horizontal and vertical section, and side views showing schematically the same detail as in FIG. 3 under two different conditions of its operation;

Figure 2:
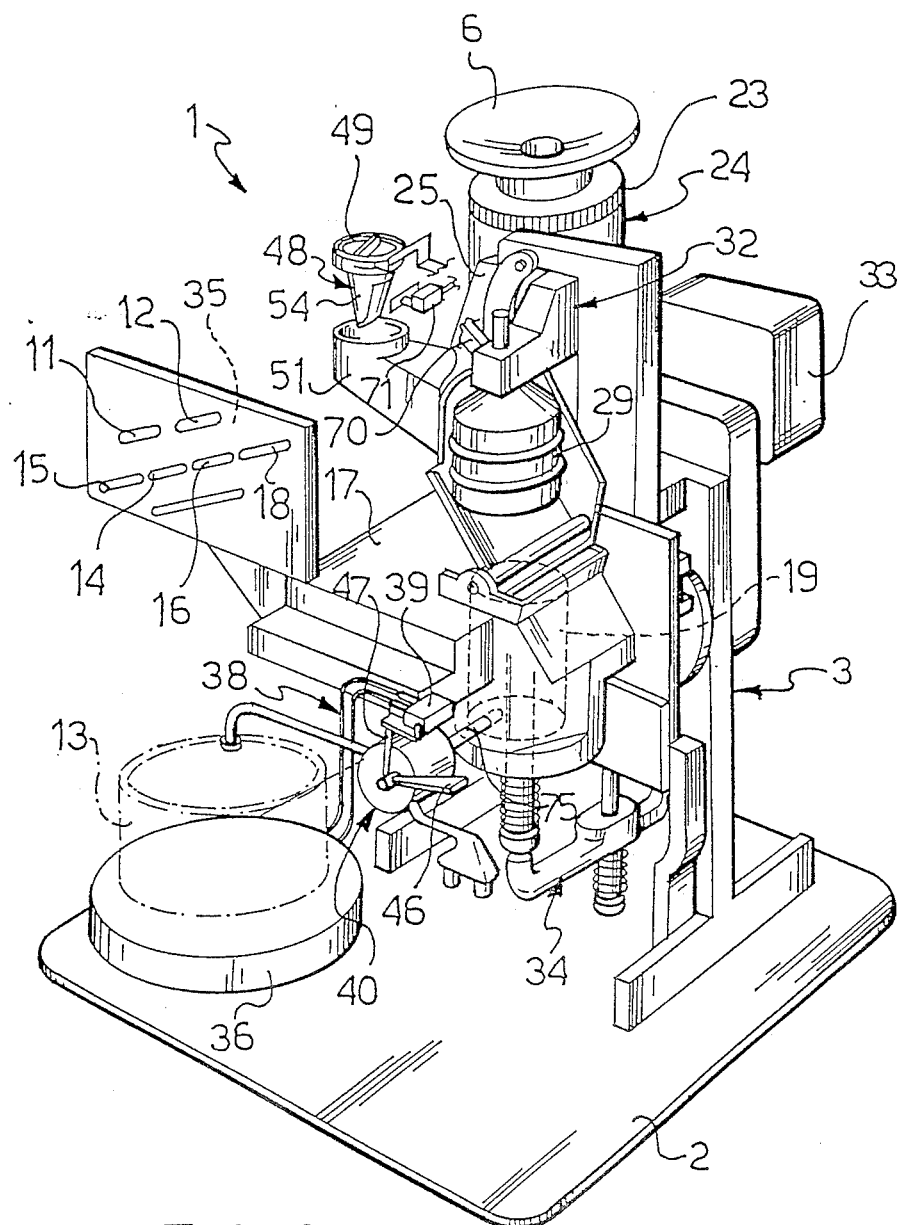
FIG. 2 is a vertical elevation, perspective view showing schematically the machine of FIG. 1.
Figure 13:
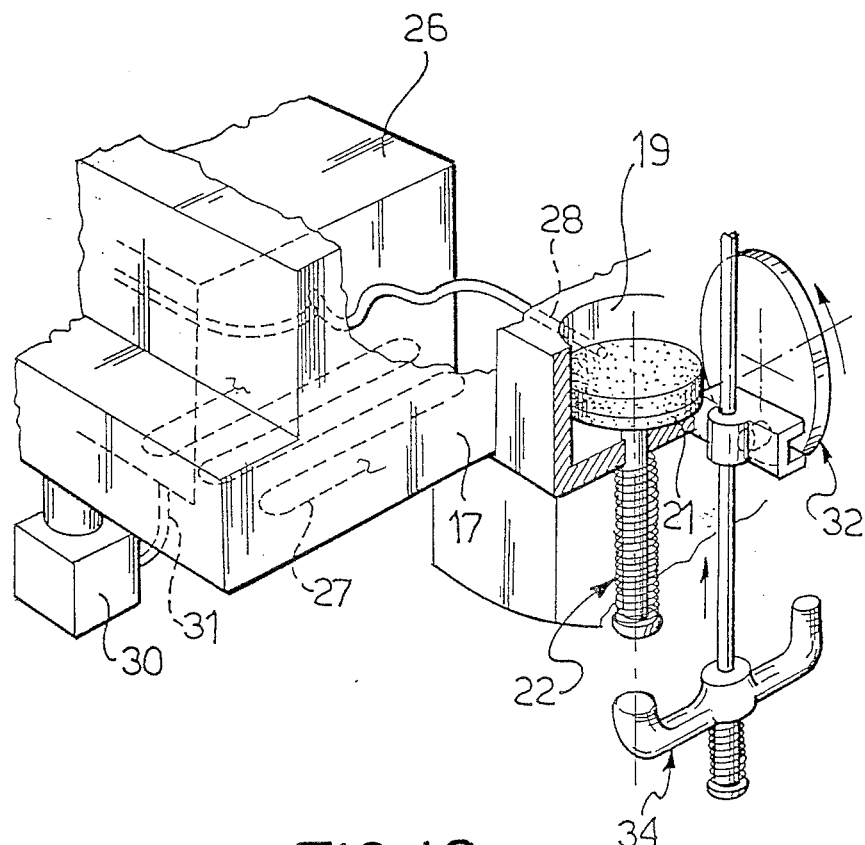

FIGS. 10, 11, and 13 are front and vertical section views of further details of the machine shown in FIG. 1; and FIG. 12 is a block diagram of the machine shown in FIG. 1.

With reference to the drawing views, generally indicated at 1 is an automatic household-type machine for selectively preparing either espresso coffee or German coffee percolate.

The machine 1 comprises a machine base 2 and supporting frame structure 3 upright on the base 2.

The frame structure 3 is adapted to provide support for the component parts of the machine 1 as well as for an outer protective shell or body 9 shown in FIG. 1. The body 9 has at the top two portions 7 and 8 which extend substantially along two different horizontal planes and are interconnected into a step-like formation; defined on the first, 7, of such portions, or uppermost portion, is an elongate door 4 for access to a conventional funnel-shaped receptacle 6 adapted to receive coffee grains thereinto.

The body 9 also comprises a front wall 10 radiused to the uppermost portion 8 and carrying controls for the machine 1, namely:

a power supply main switch 11, a control pushbutton 12 for activating the operating cycle of the espresso coffee preparation mode, a selector 14 for having either one or two espresso coffee doses dispensed, a control 15 for adjusting the amount of the coffee percolate to be dispensed on a continuous basis, an additional control 16 for adjusting the flow rate of the steam supplied to a delivery nozzle not shown because conventional, and a pushbutton control 18 for activating the operation cycle of the German coffee preparation mode.

Supported on the body 9 inside, approximately halfway up the frame structure 3 and toward the front portion thereof, is an aluminum block 17 wherein a percolation chamber 19 is formed which is cylindrical in shape and has a vertical axis and an inlet mouth 20 opening upwards. The chamber 19 is bound downwardly by a plate 21 guided for movement in the direction of the chamber axis against the bias force of a calibrated spring means 22.

The chamber 19 is intended for receiving a predetermined amount of powder coffee from a grinder 23, driven by a respective electric motor 24 carried on the machine 1 at a location beneath the funnel-shaped receptacle 6.

Also provided is a chute 25 for loading the chamber 19 with metered amounts of powder coffee, which chute extends from the lower portion of the coffee grinder 23 to the inlet mouth 20.

Also formed in the block 17 is a boiler 26, equipped with electric resistance heaters 27 and in fluid communication with the percolation chamber 19 through a conduit 28. Furthermore, an outlet conduit 75 is provided from the chamber 19 for dispensing the coffee percolate, and an electrically operated pump 30 is included for feeding water into the percolation chamber 19.

The pump 30 draws from a water reservoir, not shown because conventional, which can be replenished through the door 5 in the upper portion 7 of the body 9. The pump 30 is in fluid communication with the boiler 36 through a conduit 31.

The machine 1 further comprises a piston 29 so dimensioned as to fit with a small clearance into the chamber 19 for the purpose of compacting the powder coffee, which piston is at the opposite location from the plate 21 by a drive assembly, indicated at 32 and associated with a gear motor 33.

A means 34 is arranged to guide the plate 21 axially toward the inlet 20 of the chamber 19 as the piston 29 moves up, such that the spent cake of powder coffee can be ejected automatically.

In addition, the machine 1 comprises an electronic control device 35 incorporating a timer 74 which consists of an oscillator the oscillating cycle whereof can be set through the selector 14 or the adjustment control 15.

The device 35 is effective to operate the pump 30 for predetermined time periods in order to allow preparation of a more or less diluted coffee percolate, i.e. a more or less "weak" one.

Advantageously the machine 1 comprises a heater plate 36 carried on the base 2 laterally of a conventional shelf 37 onto which coffee cups will be resting. The heater plate 36 provides support for a pot 13 intended to contain German coffee percolate.

The heater plate 36 is connected to an electric power supply circuit 38 having a micro-contact 39 connected serially therein.

The machine 1 further comprises a manually operated valve 40 with two ways 41 and 42, which is mounted on the free end 43 of the outlet conduit 75 from the percolation chamber 19. Connected to the respective outlet ways 41 and 42 of the valve 40 are a first conduit 44 intended for dispensing espresso coffee, and a second conduit 45 extending cantilever-fashion over the heater plate 36 and being intended for dispensing German coffee percolate.

The valve 40 is fitted with a knob 46 for hand operation thereof, which knob carries a lug 47. The aforementioned micro-contact 39, connected in the power supply circuit 38 to the heater plate 36, is supported on the machine 1 at the valve 40 location so as to interfere with the angular travel path of the lug 47 on the knob 46. The micro-contact 39 is automatically activated simultaneously with the valve 40 as the latter is switched to dispense German coffee through the outlet 41 and the conduit 45.

It will become directly apparent to a skilled person in the art from the above discussion that the valve 40 could be provided with a servo-mechanism, not shown because known per se, to be linked operatively to the electronic control device 35 and being effective to automatically switch over the valve 40 to dispense German coffee, upon operation of the control pushbutton 18.

Advantageously, the machine 1 also comprises a receptacle or hopper 48 for receiving lyophilized coffee powder therein when German coffee percolate is to be prepared. Said receptacle 48 has a lid 49 and is supported above a chute 51 communicated with the chute 25 for loading the chamber 19 with said coffee powder.

The receptacle 48 is substantially frusto-conical in shape, with a bottom portion 52 and a side portion 53 which are formed integrally, and structurally independent and tiltable relatively to the remaining portion 54 of the receptacle.

More specifically, the side portion 53 is hinged to the fixed portion 54 of the receptacle 48 by means of a pintle 55 located directly below the lid 49. Also provided is a lug 76 formed integrally with the portion 53 and jutting inwardly in the receptacle 48.

The lid or door 49 is pivotable through a set angle at the top of the receptacle 48 within an annular guide 56 into which it is fitted by having peripheral teeth 57 passed with small clearance through corresponding openings 58 in the annular guide 56.

An elastic element, specifically a bias spring 60, is provided against which the lid 49 can be displaced angularly. The spring 60 is connected at one end to a point 61 on the receptacle 48 and at the other end to a slider 62 shiftable angularly together with the lid 49.

The slider 62 has a portion 63 outside the receptacle 48 which is connected, as through an opening 64 provided peripherally in the receptacle itself, to a portion 65 in the form of an annular segment which is slidable in the guide 56 between a pair of teeth 57 of the lid 49.

The outboard portion 63 of the slider 62 has a raised tooth 66 which, as the slider is being shifted angularly, will become engaged by a detent 67 to hold the lid 49 in a travel limit position.

The detent 67 comprises a reed 68 which acts pawl-fashion on the tooth 66; the reed 68 is supported on the free end 69 of an arm 70 which extends cantilever-fashion horizontally from the drive assembly 32 for the piston 29 and is rigid with the piston itself.

Advantageously, the lid 49 has a fin 50 attached vertically to it on the side facing the receptacle 48 interior.

That fin 50 is intended to encounter, during the angular displacement movement of the lid 49, the lug 76 and enable the bottom 52 of the receptacle 48 to be opened.

A micro-contact 71 is provided, moreover, which is suspended within the machine 1 from a rod 72 attached to the portion 8 of the body 9, in the vicinity of the side portion 53 of the receptacle 48 which, being hinged on the pintle 55, is shiftable angularly about this pivotal point toward the micro-contact 71, with a toggle 73 active on said micro-contact being interposed therebetween.

The micro-contact 71 is connected serially in a power supply circuit to the grinder 23, to de-activate the grinder when the machine is set up to prepare German coffee percolate.

The operation of the coffee-making machine according to the invention will be now described with reference to a starting condition with the machine 1 at any one stage of its operation cycle.

By closing the main switch 11 of the machine, electric power is supplied to both the electronic control device 35 and the resistance heaters 27 of the boiler 26 which will bring the water within the boiler to working temperature.

On the machine 1 being switched on, the electric gear motor 33 is also started to complete a no-load downward and upward cycle of the piston 29 to thereby set the machine 1 to a start or initial condition of its operation cycle.

It will now be up to the user to either select, through the selector control 14, the preparation mode for one or two espresso coffee doses, or for German coffee percolate.

In the latter case, the user should place into the hopper-like receptacle 48 a metered amount of lyophilized coffee powder after raising the lid or door 49.

Thereafter, the lid 49 is closed again and turned through a set angular distance to cause the fin 50 to encounter the lug 76 and shift angularly the side portion 53 of the receptacle 48 so as to open the bottom 52. Through the chute 51, the chamber 19 is loaded with the metered amount of coffee powder and, on the temperature of the water in the boiler 26 reaching a predetermined value as sensed by a conventional thermistor, a light is automatically turned on to visually indicate that the machine 1 is now ready to complete an operation cycle.

The angular displacement of the portion 53 and the opening movement of the bottom 52 will interfere with the micro-contact 71 to move it to the "off" position via the toggle 73 and cut off the power supply to the grinder 23. Accordingly, the espresso coffee-making feature of the machine 1 becomes temporarily disabled until the German coffee percolate preparation cycle is completed.

At the same time, by pivoting the lid 49, the tooth 66 on the slider 62 is engaged with the detent 67, allowing the lid to stay substantially in this travel end position against the bias of the spring 60.

At this stage, by depressing the control pushbutton 18, the operation cycle of the machine 1 is initiated which involves activation of the assembly 32 and compression of the powder coffee charge by the piston 39. The downward stroke of the piston 29 also entails the downward movement of the arm 70 attached thereto, which results in the reed 68 being shifted downwards and set against the tooth 66 with a pawl-like action.

On the tooth 66 being released from that engagement, the elastic bias force applied by the spring 60 will return the slider 62 and lid 49 back to their initial positions to enable the receptacle 48 to be closed and the grinder 23 to be turned on via the microswitch 71.

During the percolation step, the electronic device 35 will be operating the pump 30, connected to the boiler 26, for a set time period. However, the duration of the water delivery step may be adjusted by the user manipulating the adjustment control 15 which acts on the oscillator of the timer 74 to vary its oscillation cycle and change thereby the time basis for the machine operation cycle.

Through the outlet 42 of the valve 40 and the conduit 45, the German coffee percolate is ultimately directed into the pot 13 resting on the heater plate 36c which is held under power by the lug 47 of the valve knob 46 acting on the micro-contact 39 and for a tie duration which is adjusted through the control device 35.

On completion of the percolation step, the gear motor 33 will raise the piston 29 and plate 21 in a conventional manner to the mouth of the chamber 19 to eject the spent coffee cake into a bin laterally of the block 17.

In this situation, the German coffee percolate-making cycle is over, and the user allowed to decide at will whether the setting of the valve 40 should be changed, through the knob 46, to turn off the heater plate 36 and make the machine 1 ready to perform an espresso coffee-making cycle.

Thus, the coffee-making machine of this invention has a major advantage in that it is fully automatic, and is particularly versatile in that it enables the user to either prepare espresso coffee or German coffee percolate, with the added faculty of adjusting the amount of coffee percolate in either cases once the choice has been made.

Further advantages are afforded by its simple structure, reliable operation, and particularly short-lasting operation cycle.

I claim:

1. An automatic household-type machine for preparing espresso coffee or German coffee percolate, being of a kind which comprises a percolation chamber wherein a piston is guided for movement, a chute for loading said percolation chamber with a metered amount of powder coffee, a heated water storage boiler, a pump having its delivery side in communication with said percolation chamber and its suction side in communication with said boiler, and outlet conduit leading out of said percolation chamber for dispensing the coffee percolate, and an electronic control device operated by a timer to activate said pump for operation over predetermined time intervals, the improvement comprising a heater plate carried on a base of said machine and a manually operated two-way valve mounted on the free end of said outlet conduit, connected to respective outlets of said valve there being a first conduit adapted to dispense espresso coffee and a second conduit extending cantilever-fashion over said heater plate and being adapted to dispense German coffee percolate.

2. A machine according to claim 1, wherein said heater plate is connected to an electric power supply circuit into which a micro-contact is connected serially which is automatically activated on said valve being switched to dispense German coffee.

3. A machine according to claim 2, wherein said micro-contact is carried on the machine at said valve and activated simultaneously with the latter.

4. A machine according to claim 2, wherein said valve is fitted with a knob for manual operation thereof, and that said micro-contact is carried on the machine at a location whereby it interferes with the angular travel path of said knob.

5. A machine according to claim 1, wherein it further comprises a receptacle adapted to receive powder coffee and provided with a lid, said receptacle being supported above a chute and having an openable bottom.

6. A machine according to claim 5, wherein said receptacle is substantially frusto-conical in shape with the bottom portion and a side portion being formed integrally, structurally independent, and tiltable relatively to the remainder of said receptacle.

7. A machine according to claim 6, wherein said side portion has a lug formed integrally therewith and jutting into the receptacle, and that said lid is guided pivotally at the top of the receptacle and comprises a fin attached to the side thereof facing the receptacle interior, said fin being effective, during the angular movement of the lid, to encounter said lug and tilt open said side portion and the bottom of said receptacle.

8. A machine according to claim 5, wherein said lid is shiftable angularly at the top of said receptacle within an annular guide and against the bias force from an elastic bias means.

9. A machine according to claim 7, wherein it comprises a slider rigid with the lid and guided for movement outside said receptacle, and comprises a fin attached thereto on the side facing the receptacle interior, said fin being effective, during the angular movement of the lid, to encounter said lug and enable said side portion and the bottom of said receptacle to tilt open.

10. A machine according to claim 7, wherein it comprises a slider rigid with the lid and guided for movement outside said receptacle, said slider being formed with a tooth adapted to be held engaged by a detent to thereby hold the lid at a travel end position.

11. A machine according to claim 10, wherein said detent comprises a reed acting pawl-like on said tooth and being supported on the free end of an arm extending horizontally cantilever-fashion and being fast with said piston.

12. A machine according to claim 1, wherein said electronic control device is connected to the input end of, and operatively linked to, a start pushbutton operative to initiate the percolation cycle for said German coffee.

13. A machine according to claim 12, wherein said valve comprises a driving servo-mechanism activated by said electronic control device on said start pushbutton being depressed.

* * * * *